(12) United States Patent
Gordon et al.

(10) Patent No.: US 11,393,338 B2
(45) Date of Patent: Jul. 19, 2022

(54) VEHICLE SAFETY AND ALERT SYSTEM

(71) Applicants: Devin Gordon, Bend, OR (US);
Morgan McCoy, Bend, OR (US)

(72) Inventors: Devin Gordon, Bend, OR (US);
Morgan McCoy, Bend, OR (US)

(*) Notice: Subject to any disclaimer, the term of this patent is extended or adjusted under 35 U.S.C. 154(b) by 0 days.

(21) Appl. No.: 17/181,920

(22) Filed: Feb. 22, 2021

(65) Prior Publication Data

US 2021/0264787 A1    Aug. 26, 2021

Related U.S. Application Data

(60) Provisional application No. 62/979,201, filed on Feb. 20, 2020.

(51) Int. Cl.
*G08G 1/16* (2006.01)
*B60Q 1/46* (2006.01)
*B60Q 5/00* (2006.01)
*B60R 16/023* (2006.01)

(52) U.S. Cl.
CPC ............... *G08G 1/16* (2013.01); *B60Q 1/46* (2013.01); *B60Q 5/005* (2013.01); *B60R 16/0231* (2013.01)

(58) Field of Classification Search
CPC ........ B60Q 1/46; B60Q 5/005; B60R 16/0231
See application file for complete search history.

(56) References Cited

U.S. PATENT DOCUMENTS

| 2016/0355179 | A1* | 12/2016 | Cannella | ................. B60T 7/22 |
| 2019/0232867 | A1* | 8/2019 | Bednar | ................. H04R 1/025 |
| 2019/0259283 | A1* | 8/2019 | Sung | ................. B60Q 5/006 |

FOREIGN PATENT DOCUMENTS

CN             214450611 U    * 10/2021

* cited by examiner

*Primary Examiner* — Omer S Khan
(74) *Attorney, Agent, or Firm* — Donn K. Harms

(57) ABSTRACT

A system for automatic controlling of sonic and visual warnings on a vehicle is provided. The system uses a controller and software configured to the task of initiating sonic and light emission warnings of vehicle movement to surrounding workers in the area of the vehicle. Signals from engaged light and sound sensors may be employed to alter the sonic warnings to a more easily heard frequency and the light emitted warnings to a more easily seen color and brightness.

9 Claims, 2 Drawing Sheets

VEHICLE SAFETY AND ALERT SYSTEM

Figure 1:
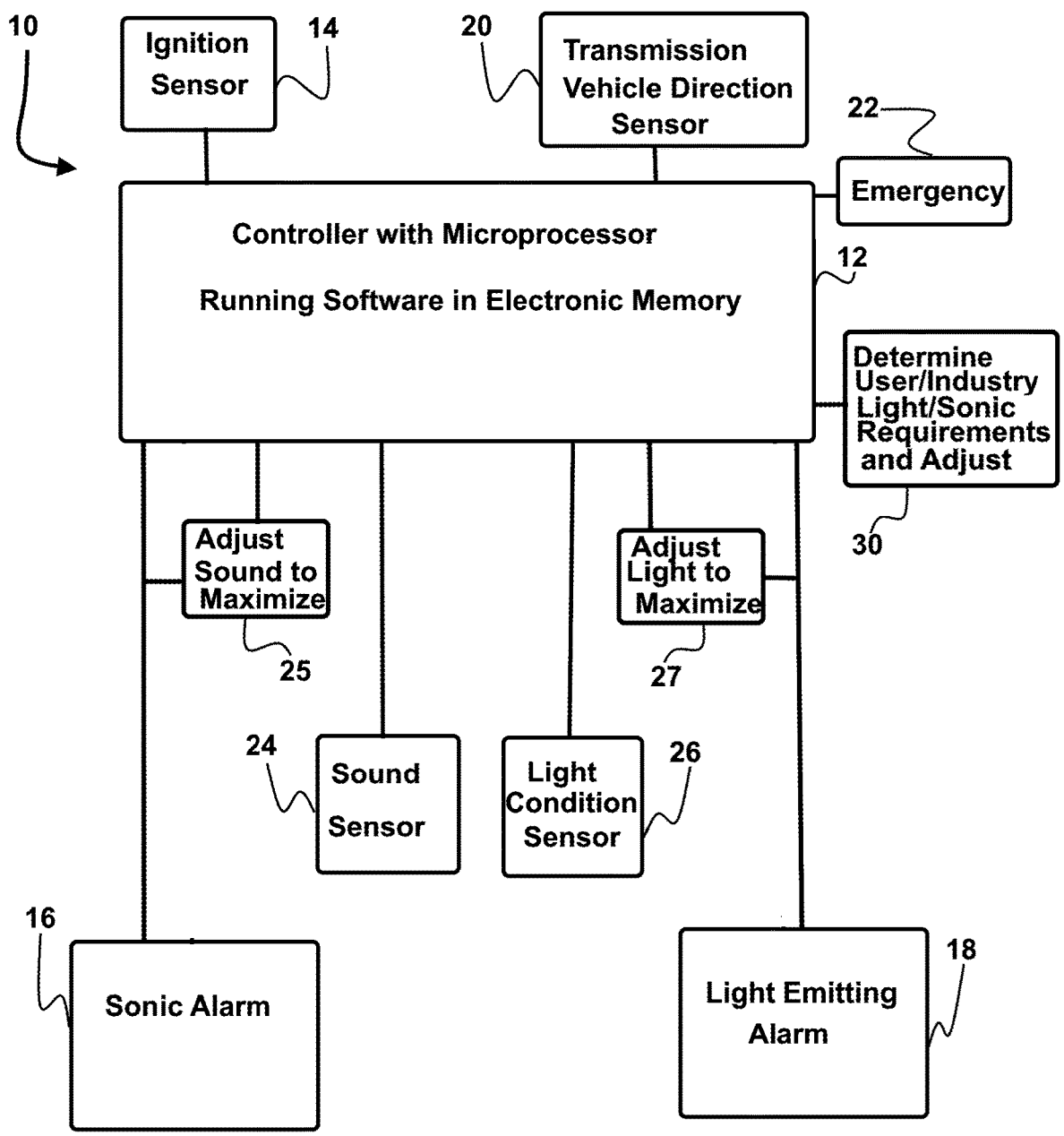

This application claims priority to U.S. Provisional Patent Application Ser. No. 62/979,201, filed on Feb. 20, 2021, which is incorporated herein in its entirety by this reference thereto.

FIELD OF THE INVENTION

The present device relates to the safe operation and movement of motor vehicles. More particularly, the disclosed device and system relate to a system and method to automatically actuate sonic and/or illumination alarm components on a vehicle such as those employed for mining and on large construction sites, to provide warnings to proximate personnel and other vehicles of an imminent movement of a vehicle.

BACKGROUND OF THE INVENTION

Since the invention of motorized vehicles, their movement in proximity to other vehicles, and especially near pedestrians who are working or are situated proximate to such moving vehicles, has created the potential for injury.

One example highlighting the potential for injury and accidents exists in the mining industry. Conventionally, safety protocols for vehicles operating in the mining industry, require the operator/driver of a vehicle to take multiple actions to warn humans and drivers of other vehicles which are proximate thereto, that movement of the vehicle is imminent.

To that end, in the mining industry, the driver of a stationary vehicle may be conventionally required to honk the vehicle horn manually upon starting the vehicle. Subsequent to this engine starting warning, prior to driving the vehicle, the driver may be required to again honk the vehicle horn a defined number of times, prior to moving the vehicle in a forward or backward direction.

Workers on the site are trained to listen for vehicle horns and to count the number of honks sounded by a given vehicle to determine which direction of travel the driver activating the horn intends to proceed. Having been trained to listen and react to the differing numbers of consecutive honks of a vehicle horn, the pedestrian workers and other vehicle drivers who are proximate to the honking vehicle can ascertain the imminent direction the honking vehicle intends to travel and to get out of the way of that discerned path. To communicate an emergency to surrounding drivers and workers, another number of sequential honks is used.

While different mines and work sites, at different geographic locations, may employ different numbers in a sequence communicating such upcoming vehicle movement, all mines and many large construction sites and the like are required by OSHA and/or MSHA safety regulations to have such a sonic warning program in place and to train workers to understand the communicated horn sequences which warn of vehicle movement.

However, the actual horn actuation for the numerical sequence is solely up to the operator or driver of each vehicle. Should the required horn sequence not be actuated by a driver or this honking action is not performed prior to every time the vehicle ignition is started, powers forward or powers in reverse, workers proximate thereto are placed in danger. Such a lack of horn actuation in the correct sequence can easily be caused by poorly trained drivers, tired drivers, or negligent drivers. Further, even trained drivers with the best of intentions can make a mistake in a horn honking sequence. Such occurrences create a massive safety hazard for workers proximate to the vehicle which is about to move, or for drivers of other vehicles who may be listening for horn honks from a vehicle they are approaching.

Such a sonic warning system, announcing the intended action and movement by vehicle drivers, is widespread in the mining industry, for example. On mining sites which have numerous vehicles, it is common to require the operator of each such vehicle to blast the horn once during the vehicle ignition startup. For running vehicles about to move, it is common to require a horn actuation twice prior to moving the vehicle in the forward direction and three times in sequence prior to moving the vehicle in a reverse direction. Also common is a sequence of four honks to signal surrounding workers and vehicle drivers of an emergency.

As noted, if the operator fails to perform any of these required horn sequence actuations, the movement of their vehicle can easily result in serious injuries or death of proximate workers who are not alerted to move out of the way if needed.

A similar safety warning system for intended vehicle movement exists in the commercial delivery industry for drivers of vehicles for services like UPS, DHL, and FEDEX. The danger for such delivery services, however, is not to fellow workers on a job site who are acutely aware of potential vehicle movements. Instead the injury danger is to pedestrians and the general public.

To that end, a conventionally used warning system for such delivery drivers requires them to actuate the horn twice if they intend to move the vehicle in reverse. Once the vehicle is moving in reverse, the drivers are supposed to actuate the vehicle horn every two seconds during rearward travel. However, this leaves the warning system up to a busy delivery driver who is constantly distracted and may or may not endeavor to follow company policy concerning audible vehicle movement warnings.

As a consequence, workers and pedestrians, who are proximate to these large vehicles, do so at their own peril because they are trusting that the drivers will adhere to safety protocols to actuate sonic warnings of vehicle movements. Such a conventional warning system creates an unreasonable risk of harm to people who are in harms way, since audible warnings of oncoming vehicles are left to the drivers who may or may not be attentive The forgoing examples of vehicle safety warning systems and the limitations related therewith, are intended to be illustrative and not exclusive. The disclosed examples and background herein does not imply any limitations on the invention described and claimed herein. Various other limitations of the related art of vehicle suspension are known, or such will become apparent to those skilled in the art upon a reading and understanding of the specification below and the accompanying drawings.

SUMMARY OF THE INVENTION

The device and system herein disclosed and described provides a solution to the shortcomings in prior art in the area of providing sonic warnings to workers and pedestrians who may be in the proximity of motor vehicles having drivers who may not be able to view their surroundings during movement of the vehicle.

The system, herein, employs a computerized controller running software configured to the task of ascertaining a vehicle's movement and determining a sonic and/or visual alarm which is appropriate to the venue and/or required for the safety of surrounding workers or pedestrians.

The system controller will be in electronic communication with the ignition switch or with other components which are energized during a starting of the engine of the vehicle in which it is positioned. Upon receipt of an electronic start signal, determined in advance to be a signal that the driver has initiated a switch or key to start the engine of the vehicle, the software running on the controller to the task, will energize the horn on the vehicle to elicit a sound such as a honk which is predetermined to be one that workers are taught to listen for, such as a honk one time. Concurrently, software running on or in communication with the controller will cause strobe lights positioned on at least the front and rear of the vehicle to flash once.

For this warning to surrounding persons about the vehicle during an engine starting, and for all the other warnings provided by the system herein, software running on the controller operating to the task, will actuate both the horn to generate an unique audible signal and will actuate the strobe lights to generate a unique and visual alarm which correlates to the audible signal. These concurrent audible and visual warnings during experimentation with the system herein, have shown to provide a synergistic combination of warnings which have shown to work better in combination than either the sonic of visual signal singularly.

This is especially true where pedestrians and workers proximate to the vehicle may be hard of hearing or wearing earphones or listening to sound through ear buds. The bright flash of a strobe light, even in peripheral vision, will capture their instant attention. For those who may be faced away from the vehicle during such sonic and flashing warnings, the sound will cause them to become aware of the proximate vehicle, and if generated at the proper frequency and volume, it will still be audible even if they are wearing headphones.

The controller will be in electronic communication with a direction sensor connected with the vehicle transmission selector or with electric circuits which correlate to a direction selection by the driver, such as reverse lights, or to the drive shaft to determine a rotational direction and vehicle direction. With the vehicle engine determined to be running, once a driver engages the transmission which will cause the vehicle to move in a selected direction, the system herein will generate different audible and visual warnings of such.

As an example, when the direction sensor communicating with the direction selection of the transmission, communicates to the controller, that a forward drive has been selected, software operating to the task on the controller will cause the horn to honk twice and concurrently or sequentially cause the strobe lights to also flash twice. As with the concurrent warning for engine start up, the system generates both of these audible and visible warnings to take advantage of the increased perception that humans will have of this synergistic combination.

The selection to move a vehicle in reverse, for most drivers, generates the most significant potential for injury to surrounding pedestrians and workers. This is because the driver cannot see the surrounding area when moving in reverse because portions of the vehicle itself block their view and because, in most vehicles, the driver seat faces forward, thus, requiring the driver to strain to turn their neck to attempt to see some of the surroundings behind and on the sides of the vehicle.

When the driver employs the transmission selector and moves it in order to move the vehicle toward the rear or in reverse, such is communicated to the controller by the engaged direction sensor and the direction determining software running in memory of the controller or communicating with it. The direction determining software then generates an electronic signal to cause a sound generator or horn to honk three times and to actuate the rear facing strobe lights and to also flash three times simultaneously with the horn. Additionally, because of the increased danger caused by the poor view of a driver moving in reverse, so long as the vehicle is powered to move in the reverse direction, the horn will continue to honk or generate sound and the rear facing light emitters such as strobe lights, will continue to flash on an ongoing basis. For example, the concurrent horn and strobe lights might honk and flash three times every five seconds until the transmission selector is shifted out of reverse position wherein the directional software determining vehicle directional movement would cause such to cease.

A further vehicle alarm to surrounding workers and pedestrians will be provided by actuation by the driver of an emergency signaling button. Once actuated, the emergency button or switch will communicate an emergency signal to the controller. Upon receipt of such an emergency signal, the software running on the controller running to the task will cause an emergency signaling of both the horn and the strobe lights, which is different from all the other signals. For example, the software running to ascertain an emergency running on the controller will generate a signal to actuate the horn and all forward and rearward facing strobe lights to activate simultaneously for four honks and four flashes. This emergency signal will continue to be issued and sounds and lights actuated, for example, every fifteen seconds until the emergency button or switch is deactivated, such as by a second signal therefrom. Of course, as with the other concurrent flashing and horn honking signals herein, the number thereof and duration thereof may be altered.

Particularly preferred in the system herein is the inclusion of a microphone or vehicle-surrounding noise sensor which communicates an electronic signal to the controller of the system and noise determination software running thereon which operates to the task of determining the surrounding sounds which currently surround the working vehicle for both the sound frequencies and volumes thereof. Employing an electronic database correlating sounds and frequencies thereof which are best heard by humans, in an environment having the sensed surrounding sounds, the noise determination software running on the controller herein can signal the controller to alter both the volume and the frequency of the sound generated by the sonic alarm, such as a horn or loudspeaker.

As used herein it should be noted that the term horn is employed for convenience. As used, a horn is intended to mean any sound generating device which when energized electrically or mechanically produces a sound as a sonic alarm. Where the term horn is used for a system herein which senses existing vehicle-surrounding sounds, and then generates sounds most easily heard by humans being subjected to such surrounding sounds, the horn can be a loudspeaker, conventional transducer, a piezoelectric transducer or similar device, which can reproduce the chosen amplified sound at the chosen frequency and volume, which the noise determining software as communicated to the controller as best suited for current easier hearing by the humans who are proximate thereto.

For example and in no way limiting, sound in the frequencies of 20 to 20,000 Hz, are well known to form the absolute borders of the human hearing range. However, human hearing, it is well known, is most sensitive to sounds in the 2000-5000 Hz frequency range. Consequently, the sonic alarm such as a sound generator or speaker can be employed to broadcast sound to the area surrounding the vehicle, in a frequency between 2000-5000 Hz, which is chosen based on the sensed sound frequencies already surrounding the vehicle to which the workers are being exposed.

In such an addition to the system, a sound in the higher end of this frequency range would be chosen by the sound determination software, it is determined that current surrounding sounds sensed are in the lower end of that range or below it. The sound determination software would reverse this choice if it were determined surrounding sounds were toward the higher end of the 2000-5000 Hz frequency range or above it. In this manner, the sound generated by the speaker or transducer or other sound generator operating as a sonic alarm is customized to maximize it to be heard by humans surrounding the vehicle in a noisy environment.

Additionally preferred in the system herein is the inclusion of and employment of one or more light sensors which sense whether the vehicle is being operated in daylight, dusk, or evening or interior darkness, and/or the color of any light from light emitters surrounding the vehicle. For example, such light sensors can be a line voltage photocell which generates and communicates an electric current and signal correlating to the current light conditions such as sun, dusk, or darkness. Such a light sensor would communicate the electronic signal generated from the photocell correlating to the current lighting conditions to the controller. Thereafter, employing light determination software running in electronic memory and operating to the task of discerning what color or light frequency a human will most easily see in the currently determined lighting conditions, the controller may adjust the light emitted by the light emitting alarm. This adjustment of emitted light may be to a color or brightness or both, which is emitted by the light emitters such as LED strobe lights, to thereby emit light in a color and/or frequency determined to be best seen by humans proximate to the vehicle in the current surrounding light conditions at the time.

For example, it is well known that human eyes have photo receptor cells called cones which best sense light during daylight. These cones contain photo-pigments which are designed to sense particular light wavelengths. Upon reception of light by the eye, these cones work to communicate to the brain the colors which they see at the moment. In daylight, humans are known to most easily see light in the color green, followed by yellow and then blue. Thus, the light determination software, running to the task of determining an optimum light emitted alarm, will adjust the light emitted by vehicle mounted light emitters to maximize human viewing. The light determination software will, thus, signal the controller to cause the light emitters to change the color of the emitted light to a greenish yellow to be more visible.

However, in combination with these cones, photo receptor cells in humans called rods provide humans with light sensing during periods of low light such as dusk and in the dark of the evening or in a cave or tunnel. In dusk or dark environments for humans, the color yellow is generally accepted as the most visibly discernable color from a distance.

Consequently, the system herein, may also employ a light condition sensor or sensors to ascertain current lighting conditions around the vehicle to sense time of day or indoor or outdoor use. Using that current lighting information as electronically communicated to the controller, the light determination software running thereon to the task of correlating the most visible color of light to humans surrounding the vehicle during the current lighting conditions, and adjusting the light emitting alarm to such is employed. Once determined such light determination software will signal the controller or the light emitters to cause the color emitted thereby to change to that determined the best human-discerned color at that moment. For darkened indoor use or evening use, the color would be adjusted to a more pure yellow, and the brightness may be reduced to avoid causing temporary blindness from overly bright lights.

Such color changes and light blinking duration changes may be accomplished by forming the light emitting alarm from a plurality of individual LEDs which generate differing colors which may be used singularly or mixed to generate the best discerned color to be seen by surrounding humans. Thereafter the emitters will flash to emit light in the color frequency determined best for the current lighting conditions.

Still further, because large commercial vehicles used for construction and mining are frequently leased for time periods and then moved to different job venues for determined periods of time, it is possible such vehicles will end up located at venues operated by different companies or government agencies. Because differing industries and different companies can have different sound alarm requirements and light warning requirements, the system herein can be configured to accommodate such. Using a warning determination database, which maintains in electronic memory the different respective sound generation and light emitting requirements for different companies at their work sites which are located at different geographic locations, the system herein can automatically adapt the sonic and visual light warnings to each.

This automatic adjustment of the sounds generated and lights emitted for each specific company may be accomplished using GPS or Cellular Phone triangulation software to determine the geographic location of the vehicle. Using location software running on or engaged with the controller which operates to the task of determining a geographic location of the vehicle and correlating such to a company warning generation database to determine the company in the warning generation database, having that geographic location. Thereafter the location software will adjust the sounds generated for movements of the vehicle and the lighting emitted by light emitters of that vehicle to those associated with the company. In the alternative the determination of the company using the vehicle to ascertain the light and sonic signals that company uses can be accomplished by positioning a scanner in the vehicle cab to scan an employee driver company identification. The company identification information will be employed in a lookup in the company warning generation database by software running to the task of determining a user company from either location or company identification, and then determining the light blinking and sonic sound generation scheme used by that company. The controller will be signaled by the software determining the company to change the light and sound emissions to those relating to the identified company user in the database.

In this fashion, where the vehicle is used by different companies in different locations and in differing industries, so long as the geographic location of the job sites of each company is held in the warning determination database, or the identification information to be found on a employee identification, the sound emissions and light emissions from the emitters for such on the vehicle, can be automatically adjusted to those of the identified user-company which the workers of that company have been schooled in as representing certain vehicle movements.

Finally, while the system herein is primarily described in terms for use with commercial vehicles used on construction sites and mining sites and the like, it can also be employed for commercial deliver vehicles to provide sonic and visual warnings to people who may be proximate to a delivery vehicle. Such would automate the sound and visual signals the drivers of such vehicles are trained and required to provide, but which are frequently forgotten when the driver is more occupied with timely delivering.

With respect to the above description, before explaining at least one preferred embodiment of the automated vehicle movement warning system disclosed and described herein in detail, it is to be understood that the disclosed suspension invention is not limited in its application to the details of construction and to the arrangement of the components in the following description or illustrated in the drawings. The vehicle movement warning system herein described and shown is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other vehicle movement warning systems carrying out the several purposes of the present disclosed device. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

It is an object of the present invention to reduce accidents caused by the movement of vehicles in proximity to workers and pedestrians.

It is a further object of this invention to provide an automated system for initiating and continuing a warning which is both audible and visual, to better warn workers and pedestrians that a vehicle in their proximity is moving and the driver thereof may not see them.

It is another object to provide an automated vehicle directional movement warning system which will create a safer environment for persons who work or are proximate to commercial vehicles which frequently must operate under limited viewing conditions.

It is a further object of the invention to provide customized sonic or sound warnings which are best heard by workers who are also being exposed to job site sounds.

These and other objects, features, and advantages of the disclosed automated vehicle movement warning system invention, as well as the advantages thereof over existing prior art, which will become apparent from the description to follow, are accomplished by the improvements described in this specification and hereinafter described in the following detailed description, which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive examples of embodiments and/or features of the disclosed vehicle movement warning system. It is intended that the embodiments and figures disclosed herein are to be considered illustrative of the invention herein, rather than limiting in any fashion.

In the drawings:

FIG. 1 depicts a flow chart of the system herein showing the computer or controller which is configured with electronic memory in which software running therein to accomplish the tasks herein operates to thereby actuate a sound emitter or horn and light emitters such flashing lights to emit vehicle movement warnings to surrounding workers.

Figure 2:
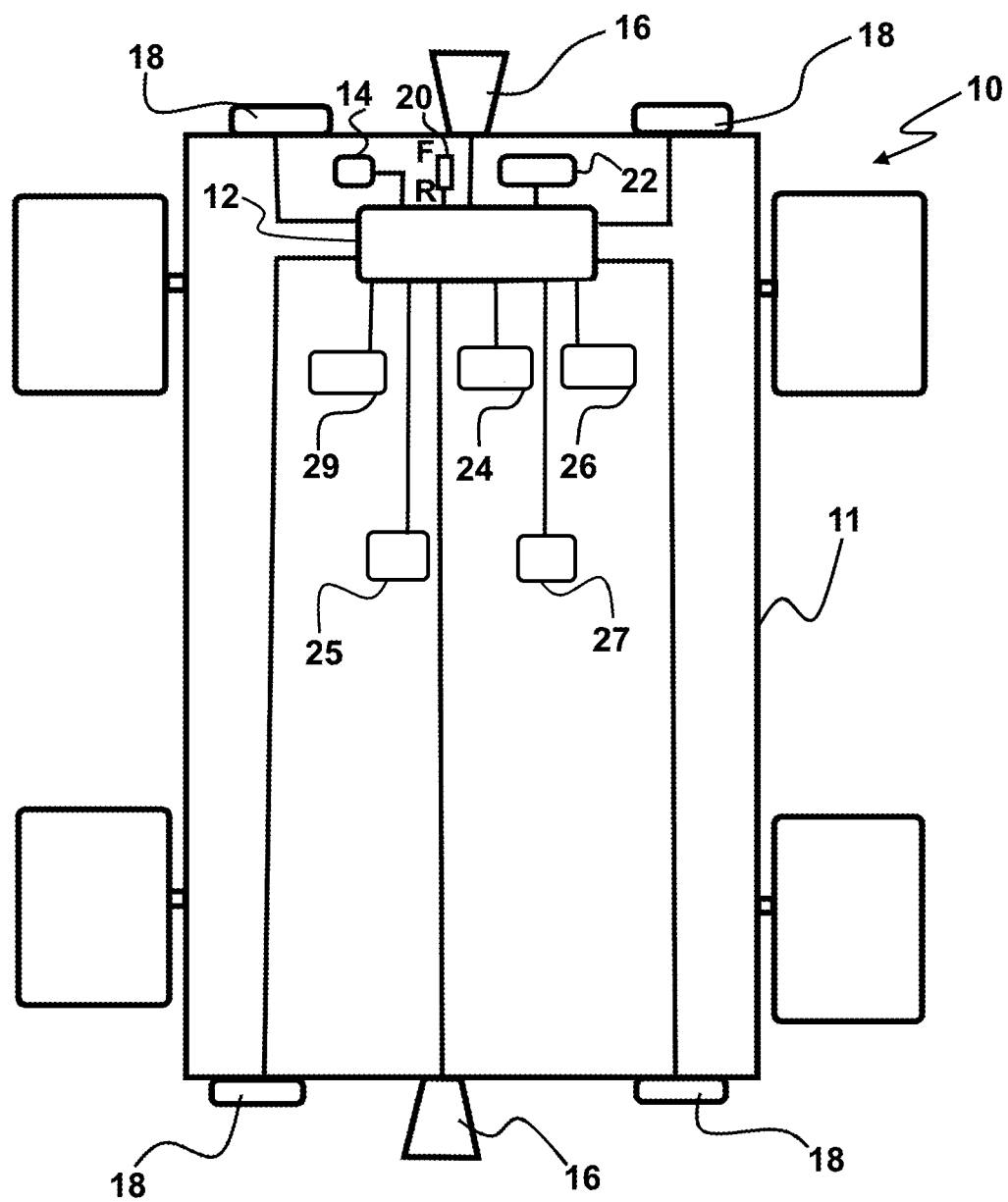

FIG. 2 graphically depicts the system herein operatively positioned on a vehicle.

DETAILED DESCRIPTION OF THE INVENTION

In this description, the directional prepositions of up, upwardly, down, downwardly, front, back, top, upper, bottom, lower, left, right and other such terms of direction or position, refer to the device as it is oriented and appears in the drawings and are used for convenience only, and such are not intended to be limiting or to imply that the device has to be used or positioned in any particular orientation.

Now referring to the drawings wherein similar components are identified by like reference numerals, there can be seen in FIGS. 1-2, a graphic depictions of the system 10 herein and the operation thereof as described herein for control of visual and sonic alarms from a vehicle 11.

As shown, and as noted and explained above, the system 10 herein, employs a computer controller 12 having a microprocessor and having available electronic memory operatively engaged or in communication therewith, in which software operating to accomplish the various tasks noted herein is running.

In all modes of the system 10, the controller 12 will be in electronic communication with an ignition sensor 14 which operates to communicate an electronic signal to the controller 12 when a driver of the vehicle has actuated a switch or key to a start position for the engine of the vehicle. Engine operation sensing software running on the controller 12, upon receipt of an electronic ignition signal from the ignition sensor 14, will generate a signal to the controller to cause a sonic alarm 16 such as a horn or transducer or loudspeaker, to generate a startup sonic warning sound to areas surrounding the vehicle, which correlates to the action of starting the vehicle.

In all modes of the system 10 herein when it is noted that the controller 12 activates a component, such may be by direct electric communication with that component or by activation of a remote switch such as a solenoid or electronically activated switch, or by communication of a signal directly to a component which has a unique identifier such as a MAC ID on a network, to activate or deactivate its respective function. Such communication between the components communicating with the controller may be by wired or fiberoptic cabling or by wireless communication. Further, while not shown, all components requiring electric power will be operatively engaged to onboard electric power of the vehicle in a conventional fashion using wires and where being remotely controlled appropriate switching controlled by the controller 12 to turn them on or off.

Where a sound is generated herein, the number and length of such sonic signals may vary with industries and companies. As described herein, a startup sonic warning is provided by a single honk or other single sound emission from a sonic alarm 16, such as a speaker or transducer. Such is generated as a vehicle startup warning sound, upon a vehicle startup, for surrounding workers to hear. Such a startup sonic warning may vary in the number of sounds or honks emitted in various industries and job sites and the system 10 herein can be adjusted for such.

Concurrent with actuating the sonic alarm 16 to generate a honk or other audible signal as a vehicle startup sonic warning or sound correlating to an engine start, the controller 12 will also actuate a light-emitting alarm 18, such as LEDs or strobe lights, which are positioned on at least the front and rear of the vehicle to emit a number of flashes of light equal to the number of honks or sounds generated by the speaker for the startup sonic warning, such as to flash once. This concurrent startup sonic warning and startup warning light, so emitted in equal numbers, provides humans proximate to the vehicle both visual and audible warnings that the vehicle engine is started and running.

With the engine running, the controller 12 is in ongoing electronic communication with a vehicle direction sensor 20 such as one engaged with the transmission selector employed by drivers to engage the vehicle with the engine to move in a particular direction. This vehicle direction sensor 20 will communicate electronic signals to the controller 12, which correlate to a current vehicle movement direction selection by the driver, such as primarily forward or reverse.

When the vehicle direction sensor 20 communicates a signal to the controller 12 that a forward driving direction has been selected, the directional software running on the controller 12 to the task of receiving a signal from the direction sensor 20 and determining the upcoming directional movement of the vehicle, will cause the controller 12 to initiate a visual and an audible warning correlating to the direction of vehicle movement. For example, the directional software, once it determines forward vehicle movement, will signal and cause the controller 12 to actuate the sonic alarm 16 or horn to honk or emit sounds twice as a forward movement sonic warning. Preferably the controller 12 will also concurrently actuate the light-emitting alarm 18, such as LED's or strobe lights, to flash the same number of times as the number of sounds emitted by the sonic alarm 16 which in forward movement is twice. Such will provide a concurrent forward direction warning light to be emitted and seen by surrounding workers.

As noted, increased risks to the humans proximate to the vehicle are present when the driver chooses to move in a reverse direction. Upon receipt of an electronic signal by the controller 12 from the direction sensor 20 that the driver actuated a selector to cause the vehicle to move in reverse, the directional software running on the controller 12 will actuate the controller to initiate a different sonic and visual signal pattern. For example, the directional software upon determining reverse vehicle movement, will cause the controller 12 to actuate the sonic alarm 16 to honk or emit other sounds three times as a reverse movement sonic warning.

Concurrently, with the actuation of the sonic alarm 16 to emit a reverse movement sonic warning, the controller upon communication of reverse movement being determined by the directional software will actuate rear-facing light-emitting alarms 18 to flash three times simultaneous with the sounds from the sound emitter 16. The flashes of light from the light emitting alarms 18 in the same number of flashes or emissions as the number of sounds or honks of the reverse movement sonic warning, will provide the surrounding workers with a rearward direction warning light and a visual cue that the vehicle is moving rearward.

Additionally and preferred, for the duration of time that the vehicle remains moving in the reverse direction, the controller 12 will continue to actuate the sonic alarm 16 to emit three sounds in short durations for the reverse movement sonic warning, and at least the rear facing light-emitting alarms 18 such as LED's or strobe lights to blink rearward direction warning light emissions at for the same number of times. This will result in a continuous sonic and visual warning, to surrounding workers, that the vehicle continuous reverse movement. For example, the concurrent sonic alarms 16 and light-emitting alarms 18 from strobe lights will both activate every five seconds until a transmission selector direction sensor 20 communicates to the directional software running on the controller 12, that the vehicle is shifted out of reverse.

Additionally, the system 10 may be enabled to communicate visually and audibly to workers and pedestrians proximate to the vehicle that an emergency exists. Such may be an emergency button 22 or switch which the driver manually activates which communicates to the controller 12 that an emergency exists. Upon receipt of such an emergency signal from the button 22, emergency sensing software running on the controller 12 running to the task, will cause an emergency sonic and light emission signaling to be actuated. For such an emergency sonic and light emission signaling, both the sonic alarm 16 and the light-emitting alarm 18 concurrently generate audible emissions and visual light emissions continuously, in a different number than that of forward movement or reverse movement or engine startup.

For example, the controller 12 in an emergency will actuate the sonic alarm 16 and all forward and rearward facing light-emitting alarms 18 to energize simultaneously and generate bursts of four honks and four flashes respectively, with short durations between each segment or burst of no sound or light. For example, four sound bursts and four light flashes over two seconds, and a one second break with no sound or light. Such will continue until the emergency switch 22 is deactivated.

As noted, to enhance the system 10 performance, a proximate sound sensor 24 may be included which will communicate information to the controller 12 and software thereon, concerning the current sound and noise conditions which are proximate to the vehicle and the workers surrounding it. Sound sampling software on the controller 12 running to the task of optimizing the audible signal emitted from the sonic alarm 16 to one maximizing 25 what humans can best hear based on the sensed sound and noise conditions of the sound sensor 24, will choose a sound and volume for emission from the sonic alarm 16, which is optimized for hearing by workers and pedestrians proximate to the vehicle and being subjected to the current sound and noise sensed.

Such will insure that the audible sounds from the sonic alarm 16 are generated in a tone, frequency, and volume best suited to the current conditions.

Finally, the system 10, herein, may also optimize the color and frequency and flashing duration and the brightness of the light emitted from the light-emitting alarm 18, to adjust and maximize such for human eyesight according to the current lighting conditions surrounding the vehicle. Using electronic signals from a light condition sensor 26 as to the current brightness and darkness conditions, the controller 12 running light sampling software operating to the task of adjusting light emissions to maximize viewing 27, can choose the most visible light color or frequency which can be discerned by humans under current lighting conditions. The light sampling software running to the task of maximizing viewability will calculate a light color and/or light frequency and/or flash duration or other light emission aspect to that which a human will most easily see and discern while positioned proximate to the vehicle in the determined lighting conditions from the light condition sensor 26.

The controller 12 based on the determination of the light sampling software running to the task of determining a light emission to maximize it for human viewing, will cause the light emitting alarm 18 such as an LED or strobe light, to alter the emitted light to a color or to a frequency determined and or to a brightness, to be best seen by humans proximate to the vehicle at the current time. Further, adjustments can be made to the duration of the flashes of light generated, as well as the brightness, in order to maximize the discerning of light emitted by the light emitting alarm 18, by humans and to avoid causing a blinding effect which can occur in low light conditions.

Finally, as noted above, the system 10 herein can include the function of automatically adapting the number of emissions of the sonic and visual light warnings to the company using the vehicle. This automatic adjustment of the number of sounds generated and number of light emissions for each specific company may be accomplished using GPS or Cellular Phone triangulation software to determine the geographic location of the vehicle from a location receiver 29. Using company determination software running on or engaged with the controller 12, which operates to the task of determining a company using the vehicle from a geographic location of the vehicle and correlating such to a user company and the sonic warnings and light emission warnings employed by the company, in a warning generation database. The company determination software will then cause the controller 12 to adjust the sound emissions generated for movements of the vehicle and the lighting emissions by light emitters of that vehicle to those associated with the company. Alternatively, the location receiver 29, can be configured to scan an employee driver company identification and ascertain the company employing the driver, and then adjusting the lighting emissions and sonic emissions accordingly.

What is claimed is:

1. A system for automatic controlling of sonic and visual warnings on a vehicle, comprising:
    a controller having a computer processor and electronic memory engaged therewith, said controller operatively positioned on a vehicle;
    a sonic alarm positioned on said vehicle;
    a light emitting alarm positioned on said vehicle;
    an ignition sensor communicating an ignition signal to said controller only when an engine on said vehicle is being started;
    engine operation software operating in said electronic memory of said controller, said engine operating software operating to the task upon receipt of said ignition signal, to communicate a startup signal to said sonic alarm to cause it to emit a startup sonic warning sound therefrom, and communicating said startup signal to said light emitting alarm to cause it to emit a startup warning light therefrom;
    a vehicle direction sensor engaged to said vehicle, said vehicle direction sensor communicating a forward direction signal to said controller when said vehicle is moving forward and communicating a reverse direction signal when said vehicle is moving rearward;
    directional software running in said electronic memory of said controller;
    said directional software operating to the task upon receipt of said forward direction signal, of causing said sonic alarm to emit a forward motion sonic warning and concurrently causing said light emitting alarm to emit a forward motion light emission therefrom;
    said directional software operating to the task upon receipt of said reverse direction signal, of causing said sonic alarm to emit a reverse motion sonic warning and concurrently causing said light emitting alarm to emit a reverse motion light emission therefrom;
    said light sampling software also operating to the task of receiving said lighting signal from said light condition sensor and determining from a second database of a corrected light brightness best seen by humans during said current lighting conditions; and
    a brightness change signal from said controller communicating a brightness change signal to said light emitting alarm whereafter said light emitting alarm emits light therefrom in said corrected light brightness for said startup warning light, said forward motion light emission and said reverse motion light emission.

2. The system of claim 1 additionally comprising:
    a light condition sensor which communicates a lighting signal to said controller, said lighting signal correlating to the current lighting conditions of an area surrounding said vehicle;
    light sampling software running in said electronic memory of said controller;
    said light sampling software operating to the task of receiving said lighting signal from said light condition sensor and determining from a database of a corrected light color best seen by humans during said current lighting conditions; and
    a color change signal from said controller communicating color change signal to said light emitting alarm whereafter said light emitting alarm emits light therefrom in said corrected light color for said startup warning light, said forward motion light emission and said reverse motion light emission.

3. The system of claim 1 additionally comprising:
    a sound condition sensor which communicates a sound signal to said controller, said sound signal correlating to the current sound present in an area surrounding said vehicle;
    sound sampling software running in said electronic memory of said controller;
    said sound sampling software operating to the task of receiving said sound condition signal from said sound condition sensor and determining a corrected sound frequency from a database of a corrected sound frequencies best heard by humans positioned in said area having said current sound present; and a sound change signal from said controller communicating a sound frequency change signal to said sonic alarm whereafter said sound emitting alarm emits sound therefrom in said corrected sound frequency for said startup sonic warning, said forward sonic warning and said reverse sonic warning.

4. The system of claim 2 additionally comprising:

a sound condition sensor which communicates a sound signal to said controller, said sound signal correlating to the current sound present in an area surrounding said vehicle;

sound sampling software running in said electronic memory of said controller;

said sound sampling software operating to the task of receiving said sound condition signal from said sound condition sensor and determining a corrected sound frequency from a database of a corrected sound frequencies best heard by humans positioned in said area having said current sound present; and a sound change signal from said controller communicating a sound frequency change signal to said sonic alarm whereafter said sound emitting alarm emits sound therefrom in said corrected sound frequency for said startup sonic warning, said forward sonic warning and said reverse sonic warning.

5. The system of claim 1 additionally comprising:

an emergency switch in operative communication with said controller to communicate an emergency signal thereto upon an activation thereof; and emergency sensing software running on said electronic memory of said controller to the task of energizing said sonic alarm to emit an emergency sonic alarm upon receipt of said emergency signal and energizing said light emitting alarm to emit an emergency light signal therefrom upon receipt of said emergency signal.

6. The system of claim 2 additionally comprising:

an emergency switch in operative communication with said controller to communicate an emergency signal thereto upon an activation thereof; and emergency sensing software running on said electronic memory of said controller to the task of energizing said sonic alarm to emit an emergency sonic alarm upon receipt of said emergency signal and energizing said light emitting alarm to emit an emergency light signal therefrom upon receipt of said emergency signal.

7. The system of claim 3 additionally comprising:

an emergency switch in operative communication with said controller to communicate an emergency signal thereto upon an activation thereof; and emergency sensing software running on said electronic memory of said controller to the task of energizing said sonic alarm to emit an emergency sonic alarm upon receipt of said emergency signal and energizing said light emitting alarm to emit an emergency light signal therefrom upon receipt of said emergency signal.

8. The system of claim 4 additionally comprising:

an emergency switch in operative communication with said controller to communicate an emergency signal thereto upon an activation thereof; and emergency sensing software running on said electronic memory of said controller to the task of energizing said sonic alarm to emit an emergency sonic alarm upon receipt of said emergency signal and energizing said light emitting alarm to emit an emergency light signal therefrom upon receipt of said emergency signal.

9. The system of claim 5 additionally comprising:

an emergency switch in operative communication with said controller to communicate an emergency signal thereto upon an activation thereof; and emergency sensing software running on said electronic memory of said controller to the task of energizing said sonic alarm to emit an emergency sonic alarm upon receipt of said emergency signal and energizing said light emitting alarm to emit an emergency light signal therefrom upon receipt of said emergency signal.

* * * * *